(12) United States Patent
Picoult et al.

(10) Patent No.: US 6,744,528 B2
(45) Date of Patent: Jun. 1, 2004

(54) METHOD AND SYSTEM FOR REMOTE PRINTING OF DOCUMENTS

(75) Inventors: Cheryl L. Picoult, Monroe, CT (US); John H. Winkelman, Southbury, CT (US); Kevin L. Strobel, Fairfield, CT (US); James R. Norris, Jr., Danbury, CT (US); John W. Rojas, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 207 days.

(21) Appl. No.: 09/728,237

(22) Filed: Nov. 30, 2000

(65) Prior Publication Data

US 2002/0065101 A1 May 30, 2002

(51) Int. Cl.⁷ .................. G06K 15/02; H04M 11/00
(52) U.S. Cl. ................ 358/1.15; 358/402; 358/403; 455/556.02; 455/95; 379/88.13; 379/88.14; 379/93.24
(58) Field of Search ............ 358/1.1–1.9, 1.11–1.18, 358/402, 403; 709/200–203, 216–253; 345/760, 864, 810; 715/501.1; 455/420, 550.01, 556.02, 95; 379/88.13, 88.14, 88.22, 93.24

(56) References Cited

U.S. PATENT DOCUMENTS

| | | | |
|---|---|---|---|
| 5,068,888 A | 11/1991 | Scherk et al. | 379/100.11 |
| 5,168,444 A * | 12/1992 | Cukor et al. | 705/1 |
| 5,327,486 A | 7/1994 | Wolff et al. | 379/93.23 |
| 5,459,458 A * | 10/1995 | Richardson et al. | 340/825.52 |
| 5,513,126 A * | 4/1996 | Harkins et al. | 364/514 A |
| 5,692,048 A | 11/1997 | Gormish et al. | 380/246 |
| 5,787,149 A | 7/1998 | Yousefi et al. | 455/422 |
| 5,790,790 A * | 8/1998 | Smith et al. | 395/200.36 |
| 5,802,460 A | 9/1998 | Parvulescu et al. | 455/92 |
| 5,873,077 A | 2/1999 | Kanoh et al. | 707/3 |
| 5,966,663 A | 10/1999 | Gleason | 455/466 |
| 5,983,073 A * | 11/1999 | Ditzik | 455/11.1 |
| 6,002,752 A | 12/1999 | Park | 379/100.15 |
| 6,006,087 A | 12/1999 | Amin | 455/413 |
| 6,008,727 A | 12/1999 | Want et al. | 340/572.1 |
| 6,008,921 A | 12/1999 | Brusky et al. | 359/146 |
| 6,119,137 A * | 9/2000 | Smith et al. | 707/523 |
| 6,134,433 A | 10/2000 | Joong et al. | 455/417 |
| 6,216,158 B1 | 4/2001 | Luo et al. | 709/217 |
| 6,240,183 B1 | 5/2001 | Marchant | 380/28 |
| 6,256,378 B1 | 7/2001 | Iggulden et al. | 379/102.03 |
| 6,289,212 B1 | 9/2001 | Stein et al. | 455/412 |
| 6,297,891 B1 | 10/2001 | Kara | 358/405 |
| 6,378,070 B1 | 4/2002 | Chan et al. | 713/155 |
| 6,674,453 B1 * | 1/2004 | Schilit et al. | 345/810 |
| 2001/0037462 A1 | 11/2001 | Bengtson | |

FOREIGN PATENT DOCUMENTS

| | | |
|---|---|---|
| EP | 1045574 A1 | 10/2000 |
| EP | 1146684 A2 | 10/2001 |
| WO | WO 00/79732 A1 | 12/2000 |

\* cited by examiner

*Primary Examiner*—King Y. Poon
(74) *Attorney, Agent, or Firm*—Ronald Reichman; Kimberly Chotkowski; Angelo N. Chaclas

(57) ABSTRACT

The present invention provides a mobile device equipped with a wireless communication capability for generating electronic documents. The mobile device uses the wireless communication capability to communicate with a separate wireless communication tag. The wireless communication tag includes such information as a print device destination address, and the capabilities of the print device matching the destination address. The mobile device receives the destination device information and sends it and a document to a remote data processing center. The document and information may be sent via a network connection or a mobile communication device to a data-processing center. Once the data center receives the information and document the data processing center, the data center determines if any translation or transcoding of the original message is required in order for the destination device to receive the message in the a format which is compatible to the desired destination device. Once transcoding or translation is effected, the message is routed to the identified destination device, which then print the message.

11 Claims, 3 Drawing Sheets

METHOD AND SYSTEM FOR REMOTE PRINTING OF DOCUMENTS

RELATED APPLICATIONS

The present application is related to U.S. application Ser. No. 09/727,893, now U.S. Pat. No. 6,654,601 entitled "Method and System for Remote Retrieval of Messages Using Spontaneous Networking Technology", filed contemporaneously hereto and assigned to the assignee of the present invention.

The present application is related to U.S. application Ser. No. 09/707,561, entitled "Method and System for Remote Retrieval of Documents", filed contemporaneously hereto and assigned to the assignee of the present invention.

FIELD OF THE INVENTION

The invention disclosed herein relates generally to the field of messaging. More particularly, the present invention relates to a system and method for printing documents and messages remotely. Specifically, this invention implements wireless technology and document transformation to communicate a message for remote printing.

BACKGROUND OF THE INVENTION

In today's rapidly paced society, professional and personal demands on messaging technologies, such as voice mail, e-mail, facsimile and pagers, have greatly increased. The development of this technology, in turn, has increased demands on people who rely on these messaging devices for a variety of business and social communications. Specifically, these expectations have forced the mobile professional to demand the ability to print messages regardless of time, location, or availability of personal printing devices.

Users, recognizing the capabilities of messaging devices, have relied on these devices such that they have become nearly indispensable tools for many businesses and individual consumers. Specifically recognized as invaluable are the inherent capabilities of a facsimile as an effective means of quickly and efficiently transmitting many types of documents from one known and specified location to another known and specified location. Facsimile machines are indispensable global tools, because they are used throughout the world and are accessible by and compatible with any other facsimile in the world. In addition, the use of facsimile machines has significantly improved the speed of transmittal of documents as compared to the sending of such a document through the postal services and/or various other express courier services, which, in general, require overnight delivery. Furthermore, facsimile machines have eased the travel burden on mobile professionals by eliminating the total number of printed documents they must carry to offsite meetings. With the aid of facsimile machines, any forgotten necessary documents may be retrieved by a simple facsimile.

Also in recent years, photocopiers have become more than just a reproduction machine. Photocopiers, which exist in virtually every office environment, have integrated the capabilities of printing and the flexibility of facsimile to become a valuable office tool. These machines have opened a new channel for communication which will enable mobile professionals to operate more efficiently and effectively.

In typical document messaging systems, a person desiring to print a document or a message, must know the physical location of the intended device by either physically connected or networked to a printer or printing device in order to print documents. During business travel, this requirement is often unrealistic. For example, often travelers staying at a hotel may desire to work in their room and then print the results of their work. In the past, in order to accomplish this, the travelers were required to bring their own printer and connect directly to their messaging device. Recognizing the need for a service and a possible business opportunity, many hotels decided to offer business offices services on-site. These business offices typically include a copier, a facsimile, a personal computer and a printer. Thereafter, in order for travelers to print their work, they first were required to save it on their own document-generating device on a floppy disk, physically carry the disk to the business office access the correct program, and then print the document. The problem arose that, not only were these systems inefficient, they were also programs on the travelers system that often were not compatible with programs at the business center. Therefore, if the systems were incompatible, the travelers had to purchase the system and load it on the business center machine, or they had to physically connect their messaging device with the business center printer and hope that the correct printer drivers were available. This problem is compounded when travelers are attempting to print items, such as e-mail documents, without first saving them to a disk. In this scenario, not only do the travelers need to locate a telephone line to enable access to their e-mail, they must also locate and access either a dedicated printer or a networked printer in order to print the e-mail. Moreover, if the e-mail has accompanying attachments, the intended recipient must again insure that the attachments are in a software program format, which is loaded on the accessed network, or that the program is present on the intended recipient's computer.

Therefore, there now exists a requirement to enable travelers the flexibility and ease of printer to his/her document/messaging at any time and location regardless of the messaging format of the original document/format.

SUMMARY OF THE INVENTION

The present invention is directed to a method and system for remote printing of a document/message, stored at a messaging device. This invention allows travelers, sales people, and anyone requiring remote access to print documents and messages at a variety of locations and in a variety of formats. In today's environment, travelers and professionals often work out of hotel rooms and other transient locations which have access to business offices which typically contain printers, personal computers, facsimiles and photocopiers. Use of those devices for printing capabilities may be hindered if the business office device is not compatible with the travelers' own system, therefore inhibiting the efficient use of the business office equipment and negatively impacting the ability of the professionals to work.

Therefore, it is often desirous for mobile professionals to have at their fingertips the ability to print documents/ messages using simple business devices, without regard to the recipient's location or the format in which the document was originally created. The present invention provides these mobile professionals with the ability to print their documents and messages, unrestricted and unlimited, by time, location, and document format.

This invention incorporates aspects of printing, facsimile, and personal computing to result in a remote document printing solution. The present invention provides a mobile device for generating electronic documents. The mobile device is also equipped with a wireless communication capability. The mobile device uses the wireless communication capability to communicate with a separate wireless communication tag. The wireless communication tag includes such information as a print device destination address, and the capabilities of the print device matching the destination address. The mobile device receives the destination device information and sends it and a document, chosen by a traveler, to a remote data processing center. The document and information may be sent via a network connection or a mobile communication means to a data-processing center. Once the data center receives the information and document, the data processing center determines whether any translation is required in order for the identified destination devices to print the document.

The data center then determines if any translation or transcoding of the original message is required in order for the destination device to receive the message in a format which is compatible to the desired destination device. For example, the message sent may be an e-mail, a specific computer program such as, POWERPOINT®, EXCEL®, or MICROSOFT WORD®, and the desired receipt may also be In any of the same variety of formats. Therefore, if the message sent is in a different form at which It is to be received, translation or transcoding may be required.

Once transcoding or translation is effected, the message is routed to the identified destination device, which then prints the message. A confirmation of delivery may be sent to the original sending party either directly from the data device or via the data processing center in order to provide assurance that certain messages have been received. Once the recipient has received a document, the system may send a confirmation of delivery by a variety of devices such as a document. In addition, if the recipient did not receive the facsimile within a designated period of time, then a message may be sent to the original sender by a variety of predetermined parameters stored in the data processing center, indicating non-receipt.

According to another aspect of the present invention, the recipient may be required to reply to confirm delivery at a message or receipt of a message within a specified period of time. If the recipient does not reply within a specified period of time, then the message is re-sent. This process may be implemented, for example, it is necessary for the sender to know that an important message was sent and received.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
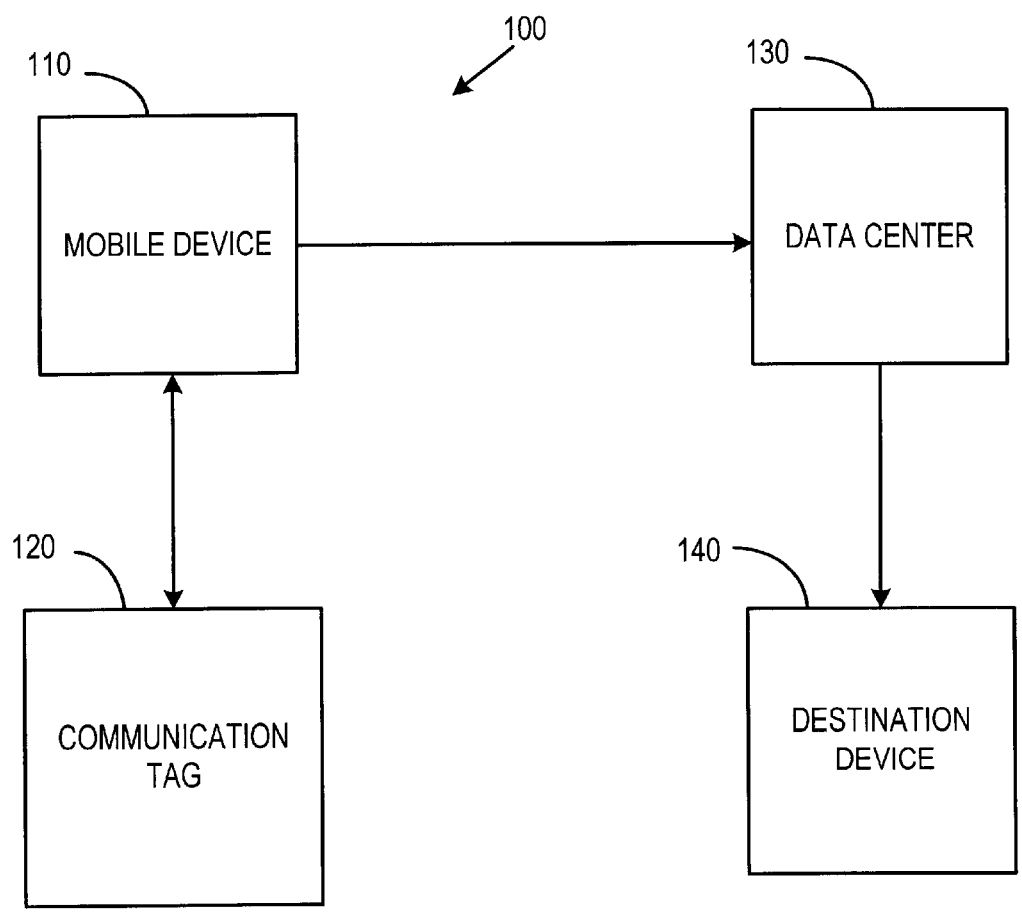
FIG. 1 is a diagram of the overall system of the present invention.

In describing the present invention, reference is made to the drawings, wherein there is seen in FIG. 1, an overall diagram of the remote printing of the present invention, designated as reference numeral 100. System 100 includes mobile device 110 for generating or storing a previously generated document and/or message and for sending the documents and/or messages to data center 130. Mobile device 110 may be a personal computer, a mobile telephone, a personal digital assistant, a pager or laptop computer. The document created and sent by mobile device 110 may be any electronically transmitted document. Data center 130 stores the message, and processes information from wireless tag 120 concerning the identified print device. Data center 130 determines whether any document translation is required in order for the print device to be able to print the document/message. Data center 130 may also send a notification to the mobile device that the message was received and/or sent to the print device. Data center 130 may also send the notification based upon a set of user preferences for receiving such notices. Destination device 140 may be a conventional printer, a facsimile machine or a photocopier.

Figure 2:
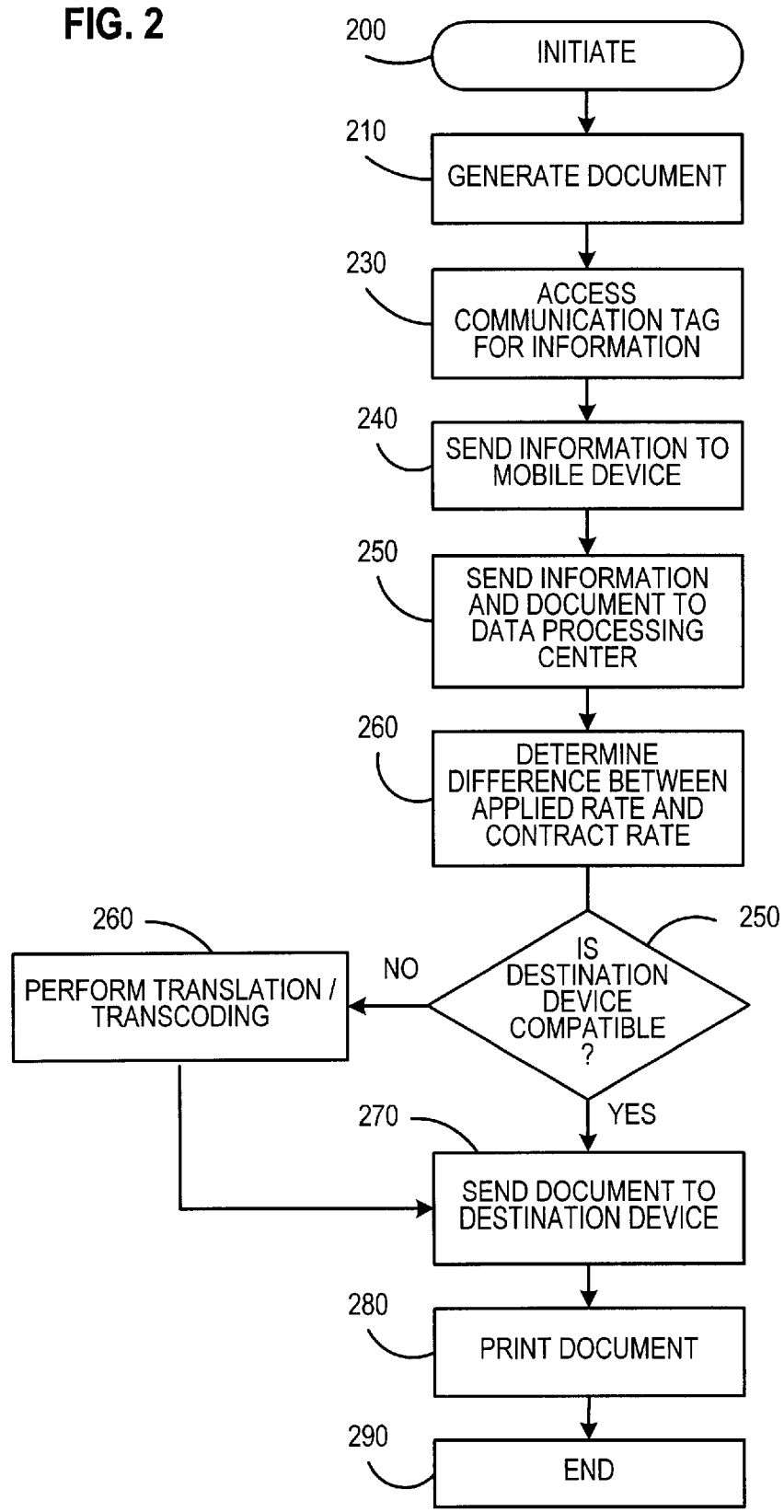
FIG. 2 is a flow chart depicting the method of the present invention.

Now turning to FIG. 2, there is shown one embodiment of the method flow of the present invention. Beginning at step 200, the message sender logs onto and is authenticated by the system. At step 210, a document is generated at a document generation device such as a computer or other electronic document generating mobile device. At step 220, the user prompts the mobile device 110 to communicate with a wireless communication tag 120 using wireless technology such as infrared, cell phone technology, etc. At stop 230, the wireless tag 120 sends to the mobile device 110 information including a destination device address and information related to a destination device capabilities, which is associated with the wireless tag. At step 340, the mobile device 110 sends the generated document and the destination device information including the destination device address to the data center 130. At step 250 the data center 130 reads the information sent from the mobile device 110 about the destination device 140 and determines whether or not the destination device 140 is compatible to enable printing the document at the data center 130. If the answer to the query is "no," the method progresses to step 260 where any necessary translation or transcoding is performed and then continues to step 270. "Translation" changes a document format into a format compatible with the destination device. "Transcoding" refers to changing the presentation of the document to fit the capabilities of a display device with limited features. If the answer to the query at step 250 is "yes" then the method progresses to step 270 where the document is sent to the destination device 140, The method continues to step 280 where destination device 140 prints the document The method ends at step 290.

Figure 3:
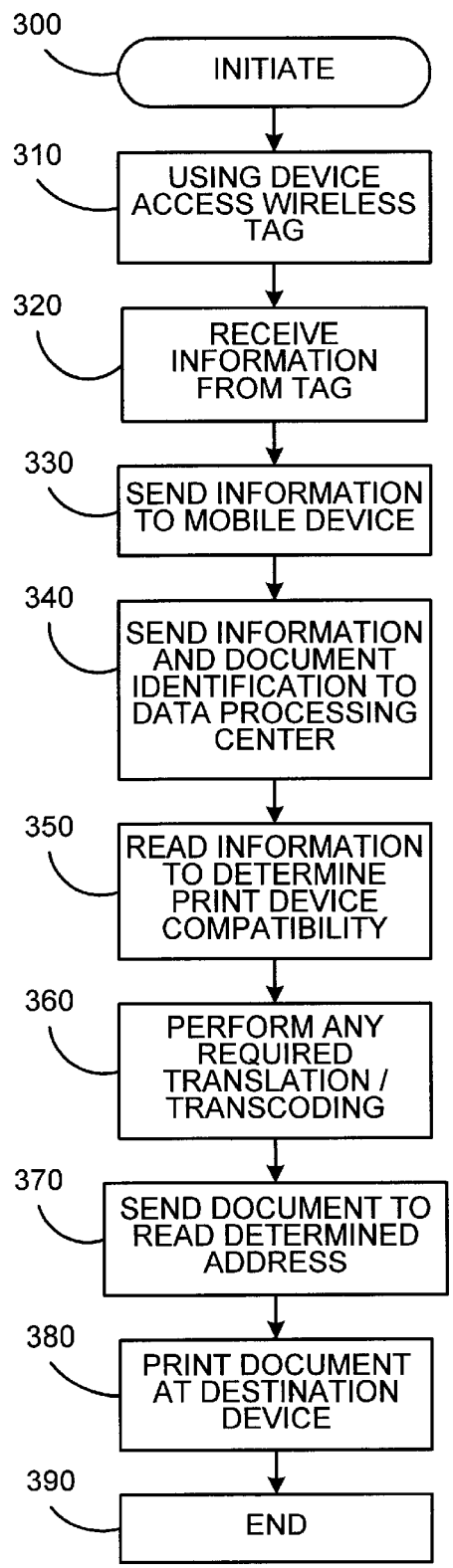
FIG. 3 is flow chart of another embodiment of the present invention.

Now turning to FIG. 3, there is shown another embodiment of the present invention. The method begins at step 300 where the system is initiated and progress to step 310 where the user accesses wireless communication tag 120 using mobile device 110. The method progresses to step 320 where destination device 140 receives information from wireless tag 120 including an address and the capabilities of the associated destination device. At step 330, the information is sent to mobile device 110. Progressing to step 340, the method sends the information and a document previously stored in mobile device 110 to data center 130. The method progresses to step 350 where data center 130 reads the information and the document to determine the address and capabilities of the destination device. At step 360, data center 130 determines whether any translation or transcoding is required and performs the determined translation/transcoding. At step 370, data center 130 sends the properly formatted document to the destination device address, and at step 380, destination device 140 prints the document. The message may also be sent securely using encryption technology or a secure mailbox. The method ends at step 390.

While the present invention has been disclosed and described with reference to a single embodiment thereof, it will be apparent, as noted above, that variations and modifications may be made therein. The above specification describes a new and improved system and method for remote receipt of a message. It is realized that the above description may indicate to those skilled in the art additional ways in which the principles of this invention may be used without departing from the spirit of the invention. Therefore, it is intended that this invention be limited only by the scope of the appended claims.

What is claimed is:

1. A method for remotely printing a document comprising the steps of:
    (a) generating a document by a sender on a mobile device, said device having wireless communication capability;
    (b) accessing from said mobile device a wireless communication tag to obtain a set of information said information including an address of a destination device and said destination devices capabilities;
    (c) sending, by the mobile device, said set of information and said document to a data processing center so that the data processing center will determine whether or not the destination device is compatible to enable printing the document;
    (d) performing any necessary document translation;
    (e) sending, from the data processing center, said document to said destination device address;
    (f) printing said document at said destination device;
    (g) delivering said document to a recipient in a specified period of time;
    (h) replying by the recipient to the sender to indicate receipt of the document; and
    (i) resending the document to the recipient if the recipient does not respond in the specified period of time.

2. The method of claim 1 further including sending a confirmation notification to said mobile device that a message was sent to said destination device address.

3. The method of claim 1, further including the step of determining recipient preferences and sending a message according to said recipient preferences.

4. The method of claim 1 wherein said mobile device is a personal digital assistant.

5. The method of claim 1 wherein said mobile device is a laptop computer.

6. The method of claim 1 wherein said mobile device is a mobile phone.

7. The method of claim 1 wherein said mobile device is a pager.

8. The method of claim 1, wherein said destination device is a photocopier.

9. The method of claim 1, wherein said destination is a facsimile machine.

10. The method of claim 1, wherein said destination is a printer.

11. The method of claim 1, wherein said wireless communication is infrared.

* * * * *